(12) United States Patent
Fujimoto et al.

(10) Patent No.: US 11,494,554 B2
(45) Date of Patent: Nov. 8, 2022

(54) FUNCTION EXECUTION INSTRUCTION SYSTEM

(71) Applicant: NTT DOCOMO, INC., Chiyoda-ku (JP)

(72) Inventors: Hiroshi Fujimoto, Chiyoda-ku (JP); Kousuke Kadono, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 173 days.

(21) Appl. No.: 16/975,550

(22) PCT Filed: Dec. 4, 2018

(86) PCT No.: PCT/JP2018/044583
§ 371 (c)(1),
(2) Date: Aug. 25, 2020

(87) PCT Pub. No.: WO2019/167373
PCT Pub. Date: Sep. 6, 2019

(65) Prior Publication Data
US 2020/0402509 A1    Dec. 24, 2020

(30) Foreign Application Priority Data
Feb. 27, 2018   (JP) .............................. JP2018-033005

(51) Int. Cl.
*G10L 15/22*     (2006.01)
*G06F 40/20*     (2020.01)

(52) U.S. Cl.
CPC .............. *G06F 40/20* (2020.01); *G10L 15/22* (2013.01); *G10L 2015/223* (2013.01)

(58) Field of Classification Search
CPC ................................ G10L 15/22; G10L 15/30
See application file for complete search history.

(56) References Cited

U.S. PATENT DOCUMENTS

| 2002/0010589 A1 | 1/2002 | Nashida et al. | |
| 2015/0095024 A1* | 4/2015 | Tsujino | G10L 15/22 704/231 |
| 2018/0233133 A1* | 8/2018 | Hilal | B60R 11/0264 |

FOREIGN PATENT DOCUMENTS

| JP | 2002-41276 A | 2/2002 |
| JP | 2006-23444 A | 1/2006 |
| WO | WO 2016/190126 A1 | 12/2016 |

OTHER PUBLICATIONS

Japanese Office Action dated Mar. 2, 2021 in Japanese Patent Application No. 2020-502812 (with English translation), 6 pages.

(Continued)

*Primary Examiner* — Ibrahim Siddo
(74) *Attorney, Agent, or Firm* — Oblon, McClelland, Maier & Neustadt, L.L.P.

(57) ABSTRACT

A function execution instruction system includes a function execution instruction unit configured to instruct execution of one or more functions, a sentence input unit configured to input a sentence, an execution function determination unit configured to determine a function the execution of which is instructed on the basis of an input sentence, a time information extraction unit configured to extract time information indicating a time from the input sentence, and a time specification unit configured to, in accordance with a determined function, specify a time used for the execution of the function on the basis of extracted time information wherein the function execution instruction unit instructs the execution of the determined function, which uses a specified time.

3 Claims, 4 Drawing Sheets

(56) References Cited

OTHER PUBLICATIONS

International Preliminary Report on Patentability and Written Opinion of the International Searching Authority dated Sep. 3, 2020 in PCT/JP2018/044583 (submitting English translation only), 7 pages.
International Search Report dated Feb. 12, 2019 in PCT/JP2018/044583 filed on Dec. 4, 2018, 1 page.

* cited by examiner

*Fig.2*

| TASK DETERMINATION RESULT | RELATIVE RELATIONSHIP INFORMATION |
|---|---|
| RECORDING RESERVATION | NEAREST FUTURE |
| RECORDING REPRODUCTION | NEAREST PAST |
| VIEWING RESERVATION | NEAREST FUTURE |

FUNCTION EXECUTION INSTRUCTION SYSTEM

TECHNICAL FIELD

The present invention relates to a function execution instruction system that instructs the execution of a function.

BACKGROUND ART

Conventionally, a system that recognizes a user's voice and executes a function on the basis of the recognized voice has been known. For example, Patent Literature 1 discloses that a function such as setting a registered place as a destination on the basis of a voice recognized by a car navigation system device or allowing viewing of a map of the registered place is executed.

CITATION LIST

Patent Literature

[Patent Literature 1] Japanese Unexamined Patent Publication No. 2006-23444

SUMMARY OF INVENTION

Technical Problem

When a function is executed, a time is specified and the specified time may be used. For example, in a recording reservation of a television program or the like, a time for performing a recording is specified. Alternatively, in a reproduction of a recorded television program or the like, a time at which the recording has been performed (what time of program) is specified. However, in natural sentences that are utterances of a user, omitted time expressions, and ambiguous time expressions are often used. For example, there are expressions such as "reserve drama from 9 o'clock," and "reproduce drama on Monday." The omitted or ambiguous time expressions may prevent a function from being appropriately executed or require an input of a time again.

One embodiment of the present invention has been made in view of such circumstances described above, and an object thereof is to provide a function execution instruction system that can appropriately function even if time expressions included in a sentence are omitted, ambiguous, and the like when a function is executed on the basis of the sentence.

Solution to Problem

In order to achieve the objects described above, a function execution instruction system according to one embodiment of the present invention includes a function execution instruction unit configured to instruct execution of one or more functions, a sentence input unit configured to input a sentence, an execution function determination unit configured to determine a function the execution of which is instructed by the function execution instruction unit on the basis of the sentence input by the sentence input unit, a time information extraction unit configured to extract time information indicating a time from the sentence input by the sentence input unit, and a time specification unit configured to, in accordance with the function determined by the execution function determination unit, specify a time used for the execution of the function on the basis of the time information extracted by the time information extraction unit, in which the function execution instruction unit instructs the execution of the function determined by the execution function determination unit, which uses the time specified by the time specification unit.

In the function execution instruction system according to one embodiment of the present invention, in accordance with a determined function, a time used for execution of the function is specified on the basis of time information extracted from an input sentence. Accordingly, even when a time expression included in the sentence is omitted, ambiguous, or the like, a time used for the execution of the function is appropriately specified according to the function the execution of which is instructed. Therefore, according to the function execution instruction system according to one embodiment of the present invention, even if a time expression included in a sentence when a function is executed on the basis of the sentence is omitted or ambiguous, or the like, it is possible to appropriately execute the function.

Advantageous Effects of Invention

According to an embodiment of the present invention, even when a time expression included in a sentence is omitted, ambiguous, or the like, a time used for the execution of a function is appropriately specified according to the function the execution of which is instructed. Therefore, according to an embodiment of the present invention, even when a time expression included in a sentence when the function is executed on the basis of the sentence is omitted, ambiguous, or the like, it is possible to appropriately execute the function.

BRIEF DESCRIPTION OF DRAWINGS

FIG. 2 is a diagram which shows information used for specifying a time.

DESCRIPTION OF EMBODIMENTS

Figure 1:
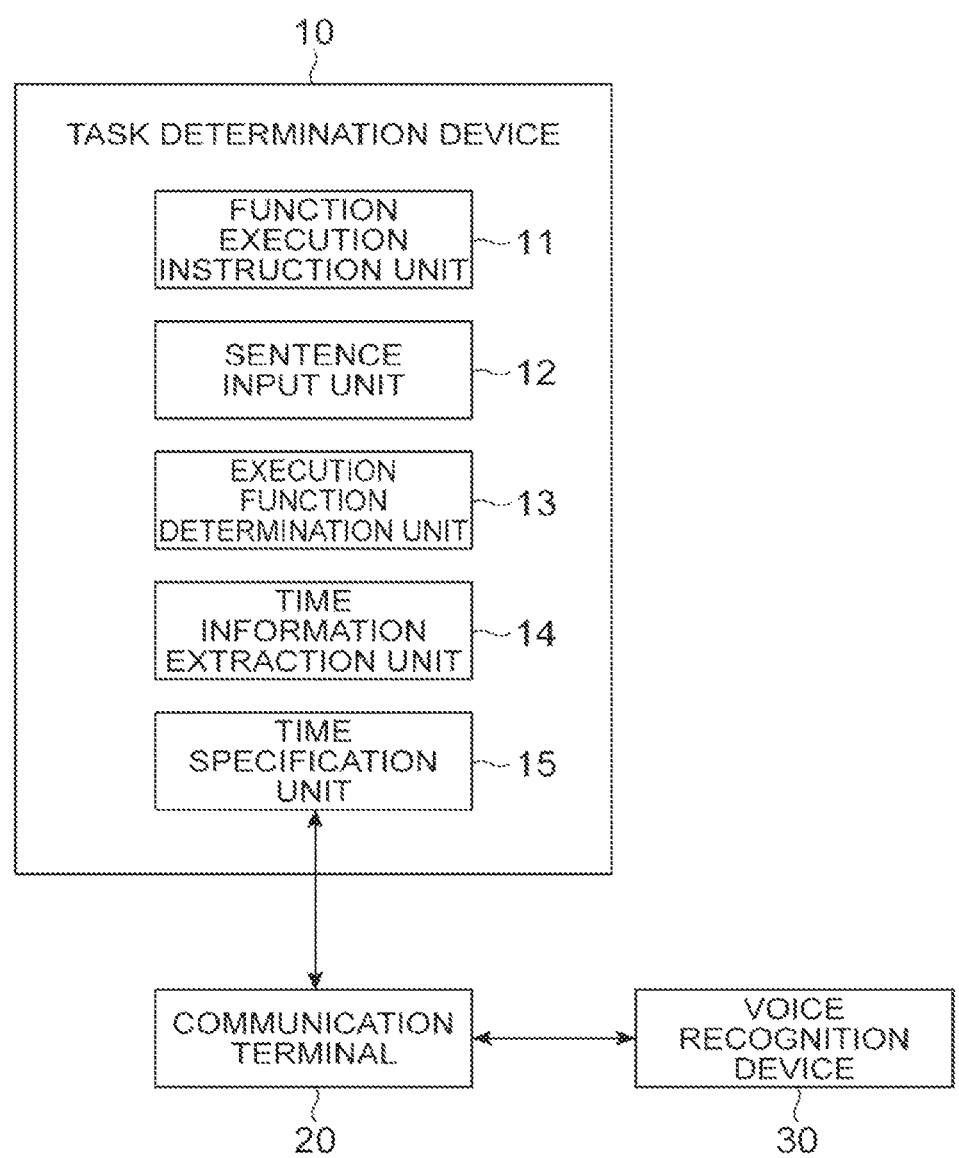
FIG. 1 is a diagram which shows a configuration of a task determination device that is a function execution instruction system according to an embodiment of the present invention.

Hereinafter, embodiments of a function execution instruction system according to the present invention will be described in detail with reference to the drawings. In the description of the drawings, the same elements will be denoted by the same reference numerals, and overlapping description will be omitted.

FIG. 1 shows a task determination device 10 that is a function execution instruction system according to the present embodiment. The task determination device 10 is a device that instructs a communication terminal 20 to execute one or more (or a plurality of) functions set in advance for. In the present embodiment, a function to be executed is called a task. As described below, a task the execution of which is instructed is determined on the basis of utterance of a user of the communication terminal 20. In addition, an instruction of the execution of a task is performed using the utterance of the user of the communication terminal 20 as a trigger. That is, the task is executed according to the utterance of the user.

The tasks the execution of which are instructed by the task determination device 10 include tasks that are executed using a time. For example, there are tasks such as recording reservation, recording reproduction, and viewing reservation. The recording reservation is a task for recording moving images such as television programs or distribution moving images, and uses a recording time. The recording reproduction is a task for reproducing recorded moving images and uses a time at which the moving images to be reproduced have been recorded. The viewing reservation is a task for allowing a user to view moving images by receiving and reproducing the moving images at a designated (reserved) time, and uses the designated time. Note that the tasks the execution of which are instructed by the task determination device 10 may include a task other than the tasks described above, and may also include a task which does not use time in the execution.

The communication terminal 20 is a device used by the user, and is, for example, a mobile phone (including a smartphone) or a personal computer (PC). The communication terminal 20 can communicate with the task determination device 10, the voice recognition device 30, and the like via a communication network (for example, a mobile communication network).

Since the tasks are executed by the user's voice as a trigger, the communication terminal 20 has a function (voice recognition interface) of inputting the user's voice. In addition, the communication terminal 20 has functions of receiving an instruction from the task determination device 10 and executing the task, for example, a function of receiving information, a function for processing information, a function of displaying information (for example, reception, recording, and reproduction functions of moving images), and the like.

That is, the communication terminal 20 has a function execution unit that executes one or more (or a plurality of) tasks. For example, the communication terminal 20 stores an application program corresponding to a task in advance, and executes the task by executing (starting) the stored application program. The task executed by the communication terminal 20 is instructed by the task determination device 10 as described below. In addition, the execution of a task may be performed by acquiring information corresponding to the task from the communication network, and the like in addition to executing the application.

The voice recognition device 30 is a device that inputs voice (voice data), performs voice recognition on the input voice, and outputs a result of the voice recognition. Specifically, the voice recognition device 30 receives voice data from the communication terminal 20. The voice recognition device 30 has a voice recognition engine, and performs voice recognition using the voice recognition engine. For the voice recognition, any conventional voice recognition methods can be used. The voice recognition device 30 acquires the result of the voice recognition as a sentence and transmits it to the communication terminal 20. Note that the sentence herein may include any character information that is obtained by voice recognition such as a set of words (a word group composed of one or more words) and can be used for determining a task.

The instruction of the execution of a task by the task determination device 10 is performed as follows. First, the user makes an utterance according to a task desired to be executed with respect to the communication terminal 20. If an utterance is made, the communication terminal 20 inputs the user's voice (utterance). The input voice is transmitted from the communication terminal 20 to the voice recognition device 30. The voice recognition device 30 receives voice from the communication terminal 20 and performs voice recognition on the received voice. The voice recognition device 30 transmits the sentence (text), which is the result of the voice recognition, to the communication terminal 20. The communication terminal 20 receives the result of the voice recognition and further transmits it to the task determination device 10.

The task determination device 10 receives the result of the voice recognition, determines a task to be executed on the basis of the result of the voice recognition, and instructs the communication terminal 20 to execute the task. For example, the task determination device 10 transmits information indicating the task to be executed to the communication terminal 20. The communication terminal 20 receives an instruction from the task determination device 10 and executes a task in accordance with the instruction. Note that the sentence or the set of words, which is the result of the voice recognition, may be sent directly from the voice recognition device 30 to the task determination device 10 without being first sent to the communication terminal 20.

Subsequently, functions of the task determination device 10 according to the present embodiment will be described. As shown in FIG. 1, the task determination device 10 is configured to include a function execution instruction unit 11, a sentence input unit 12, an execution function determination unit 13, a time information extraction unit 14, and a time specification unit 15.

The function execution instruction unit 11 is a functional unit that instructs the communication terminal 20 to execute one or more (or a plurality of) functions. Specifically, the function execution instruction unit 11 instructs the execution of a task by transmitting a command for executing the task to the communication terminal 20. Content in which the execution is instructed by the function execution instruction unit 11 is determined by functional units 12 to 15 to be described below.

The sentence input unit 12 is a functional unit for inputting a sentence (an input sentence, text data). Specifically, the sentence input unit 12 receives the sentence, which is the result of the voice recognition by the voice recognition device 30, from the communication terminal 20 and inputs the sentence. The sentence input by the sentence input unit 12 is an utterance unit of the user with respect to the communication terminal 20. That is, a sentence included in one utterance is treated as one unit. The sentence input unit 12 outputs the input sentence to the execution function determination unit 13 and the time information extraction unit 14.

The execution function determination unit 13 is a functional unit that determines a task the execution of which is instructed by the function execution instruction unit 11 among one or more (or a plurality of) tasks based on the sentence input by the sentence input unit 12. The execution function determination unit 13 inputs the sentence, which is the utterance of the user, from the sentence input unit 12, and selects a task closest to intended content of the utterance from a task list. That is, the execution function determination unit 13 interprets an intention of the sentence. For example, the execution function determination unit 13 may determine a task using a learning model (determination rules) obtained by machine learning. The determination of a task is resulted in a document classification problem of which task to classify a sentence into.

Therefore, for example, a sentence, which is an utterance example associated with a task is collected in advance. Machine learning is performed using these utterance examples as correct answer data (sample data), and a task is determined using a learning model obtained by the machine learning. The execution function determination unit 13 inputs a sentence input from the sentence input unit 12 to a task classifier based on a learning model, and determines a task using the task classifier. Note that the execution function determination unit 13 may use the task classifier based on a learning model obtained by machine learning, and it is not necessary to perform machine learning on the task determination device 10. In this case, the task determination device 10 acquires information indicating the learning model from a device that has performed the machine learning described above in advance.

In addition to the method using machine learning described above, the execution function determination unit 13 may also set a score for a word or a category in advance for each task, and specify a score from a word included in a sentence or a category associated with the word to determine a task on the basis of the score. For example, a task with the highest total score may be determined as a task the execution of which is instructed. In this case, the score of a word or a category is determined according to a degree of association with a task in advance. A task the execution of which is instructed by the execution function determination unit 13 may be determined based on the input sentence, and any other method can be used. If a task the execution of which is instructed is determined, the execution function determination unit 13 notifies the function execution instruction unit 11 and the time specification unit 15 of the task.

The time information extraction unit 14 is a functional unit that extracts time information indicating a time from the sentence input by the sentence input unit 12. The time information extracted by the time information extraction unit 14 may be an expression that is insufficient for the execution of a task, that is, may be omitted or ambiguous. For example, an expression that does not include a date such as "7:00" or an expression in which it is not known whether it is morning or afternoon may be used. The time information may indicate a relative time.

The time information extraction unit 14 inputs a sentence from the sentence input unit 12 and extracts time information by any conventional method. For example, the time information extraction unit 14 stores a regular expression for extracting time information in advance, and extracts the time information using the regular expression. For example, it is possible to extract time information of "7 o'clock" from a sentence of "reserve a drama from 7 o'clock" by storing regular expressions for extracting each time of the day from 0 to 24:00. An extraction rule other than the regular expressions may be set. For example, time information of "Monday 9 PM" is extracted by extracting a portion of "Mon. 9" from a sentence "Please reproduce Mon. 9." Alternatively, time information of "8 am" is extracted by extracting portions of "8 o'clock" and "morning drama" from a sentence of "reserve a morning drama from 8 o'clock." Alternatively, time information may be extracted using a conditional random field.

Time information may be information of a normalized expression such as ISO8601. As a result, it is possible to reduce processing cost of a subsequent stage. For example, when a time indicated by time information is 07:00:00 on Jan. 30, 2018, the time information is "2018-01-30T07:00:00." The portion of a year, month, day, hour, minute, and second indicating time, which cannot be extracted from a sentence, that is, an ambiguous portion, is set as an expression indicating that the portion is unknown in time information. For example, the portion which cannot be extracted from a sentence is expressed as "*." For example, if "7 o'clock" can be extracted from the sentence as in the example described above, the time information will be "**--T07::**," because time of the year, month, day, hour, minute, and second other than the hour is not known. According to this expression, it is possible to clarify which part needs to be complemented in processing of the subsequent stages. In addition, information other than described above, for example, information indicating a day of the week, morning or afternoon, and the like, may be included in the time information.

Note that a part of the portion that cannot be extracted from a sentence may be complemented by providing a rule for complementation in advance. For example, if the minutes and seconds of the year, month, day, hour, minute, and second cannot be extracted from a sentence, all the minute and second may be set to "0." In a case of the example described above, the time information is set as "**--**T07:00:00." This is because the sentence is considered to implicitly indicate "0" for the minute and second when the minute and second cannot be extracted from the sentence that is the utterance of the user for executing a task.

In addition, when time information extracted from the sentence is considered to have a plurality of candidates, all of the plurality of candidates may be used as the time information. For example, when the hour is from 0 to 12 o'clock in the year, month, day, hour, minute, and second, it is considered that this may be each of a time in the morning or afternoon. In this case, each time of morning and afternoon is set as time information. In a case of the example described above, the time information is set as "**--T07:00:00" indicating 7:00 am and "--T19:00:00" indicating 7:00 pm (19:00). The time information extraction unit 14 outputs the extracted time information to the time specification unit 15**.

The time information extraction unit 14 may extract supplementary information used for time specification by the time specification unit 15 in addition to the time information from the sentence input by the sentence input unit 12. For example, the time information extraction unit 14 may store keywords in advance to be extracted as supplementary information, and extract the keywords from a sentence. The supplementary information does not directly indicate a time, but is information that can be used for time estimation. For example, the word "drama" can be used as supplementary information. Since "drama" is often broadcast in the afternoon, it can be used to estimate that the time information indicates the afternoon. Extraction of the supplementary information can be performed by using regular expressions and other extraction rules in addition to the keywords set in advance. The time information extraction unit 14 outputs the extracted supplementary information to the time specification unit 15.

The time specification unit 15 is a functional unit that specifies, in accordance with the task determined by the execution function determination unit 13, a time used for the execution of the task on the basis of the time information extracted by the time information extraction unit 14. The time specification unit 15 specifies an absolute time (formal time) so that the time can be used for the execution of the task based on a time indicated by the time information extracted by the time information extraction unit 14. That is, the execution function determination unit 13 estimates a tense related to the task. The time specification unit 15 specifies, in accordance with a task determined by the execution function determination unit 13, a future or past time as the time used for the execution of the task.

The time specification unit 15 receives a notification of the task determined from the execution function determination unit 13. The time specification unit 15 inputs time information from the time information extraction unit 14. The time specification unit 15 stores information in advance in which task determination results shown in FIG. 2 are associated with relative relationship information to specify a time. The task determination results are information indicating tasks, and correspond to tasks notified by the execution function determination unit 13. The relative relationship information is information indicating how to specify a time based on the time information. Specifically, the relative relationship information indicates a relationship between a current time and a time to be specified.

The time specification unit 15 reads the relative relationship information associated with the tasks notified by the execution function determination unit 13 in the information shown in FIG. 2. The time specification unit 15 specifies a time such that it is indicated by the relative relationship information based on a time indicated by the time information and a current time (a time at which a task to be executed is determined). The time specification unit 15 has a clock function and is aware of a current time. For example, the time specification unit 15 specifies a date for time information whose date is unknown (hour, minute, and second are known).

As shown in FIG. 2, the time specification unit 15 specifies, for a task using a future time (for example, a recording time in a recording reservation or a reservation time in a viewing reservation), a nearest future time (for example, date, year, month, day) as a time used for the execution of the task, and specifies, for a task using a past time (for example, a recording time in a recording reproduction), a nearest past time (date, year, month, day) as the time used for the execution of the task.

For example, if the sentence is "reserve a drama from 19:00," the determined task is a "recording reservation," and the time information is "**-- T19:00:00." In this case, the relative relationship information associated with the task of "recording reservation" is "nearest future." If a current time is "2018-01-30T13:00:00," the time specification unit 15** specifies "2018-01-30T19:00:00" that is nearest in the future among times shown in the time information as the time used for the execution of the task.

In addition, when the sentence is "reserve a morning drama from 8:00," the determined task is a "recording reservation". The time information is "**--T08:00:00" based on portions of "8:00" and "Morning drama." In this case, the relative relationship information associated with the task of a "recording reservation" is "nearest future." If a current time is "2018-01-30T13:00:00," the time specification unit 15** specifies "2018-01-31T08:00:00" that is a nearest future among the times shown in the time information as the time used for the execution of the task.

The time specification unit 15 may specify a time also on the basis of supplementary information extracted by the time information extraction unit 14. For example, when the supplementary information indicates that the specified time (that is, the time shown in the time information) is either morning or afternoon, and the time information indicates both the morning and afternoon times, the time specification unit 15 specifies morning or afternoon on the basis of the supplementary information.

For example, if the sentence is "reserve a drama from 7 o'clock," the time information is "**--T07:00:00" and "--T19:00:00." Moreover, when the supplementary information is "drama" indicating that the specified time (that is, the time shown in the time information) is afternoon, the time specification unit 15 uses "--**T19:00:00" of the two types of time information for the time specification.

The supplementary information extracted from sentence may be information in accordance with a task determined by the execution function determination unit 13. For example, the supplementary information indicating the "drama" described above may be extracted only in a case of tasks related to television programs, distribution moving image, and the like such as a recording reservation, a recording reproduction, and a viewing reservation.

In addition, the supplementary information is not limited to specifying morning or afternoon. For example, a case in which the task is a schedule reservation and the supplementary information is "conference" will be considered. Since a conference in a company or the like is usually held during business hours (for example, from 9:00 am to 5:00 pm), if the supplementary information is "conference," a time is specified within the business hours described above.

As described above, the time specification unit 15 specifies the year, month, and day of time information whose year, month, and day (date) among the year, month, day, hour, minute, and second are unknown. Alternatively, as described above, the time specification unit 15 specifies a time (morning or afternoon) of time information whose morning or afternoon is unknown. Alternatively, when time information indicates a day of the week, the time specification unit 15 may specify the year, month, and day (date) based on the time information (day of the week). For example, a date of Jan. 15, 2018 may be specified based on time information of Monday. In addition, the time specification unit 15 may similarly specify a time of time information whose parts other than those described above are unknown. The time specification unit 15 notifies the function execution instruction unit 11 of the specified time.

The function execution instruction unit 11 instructs the execution of the task determined by the execution function determination unit 13, which uses the time specified by the time specification unit 15. The function execution instruction unit 11 is notified of the task from the execution function determination unit 13 and the time from the time specification unit 15. The function execution instruction unit 11 causes the communication terminal 20 to execute the task using the time, for example, by including information indicating the notified task and time in a command. For example, in a case of the task of a recording reservation, the recording reservation is instructed to be performed at the specified time.

The processing by the time information extraction unit 14 and the time specification unit 15 described above may be performed only when the task determined by the execution function determination unit 13 uses a time. In addition, the time specification unit 15 may determine whether the time information extracted by the time information extraction unit 14 is sufficient for the execution of the task in accordance with the task determined by the execution function determination unit 13, and, when it is determined that the time information is not sufficient, the time specification unit 15 may specify a time. The determination described above can be made on the basis of a determination rule set in advance for each task. When the time information is sufficient for the execution of the task, the function execution instruction unit 11 instructs the execution of the task using a time indicated by the time information without the time specification by the time specification unit 15. The description above is a function of the task determination device 10 according to the present embodiment.

Figure 3:
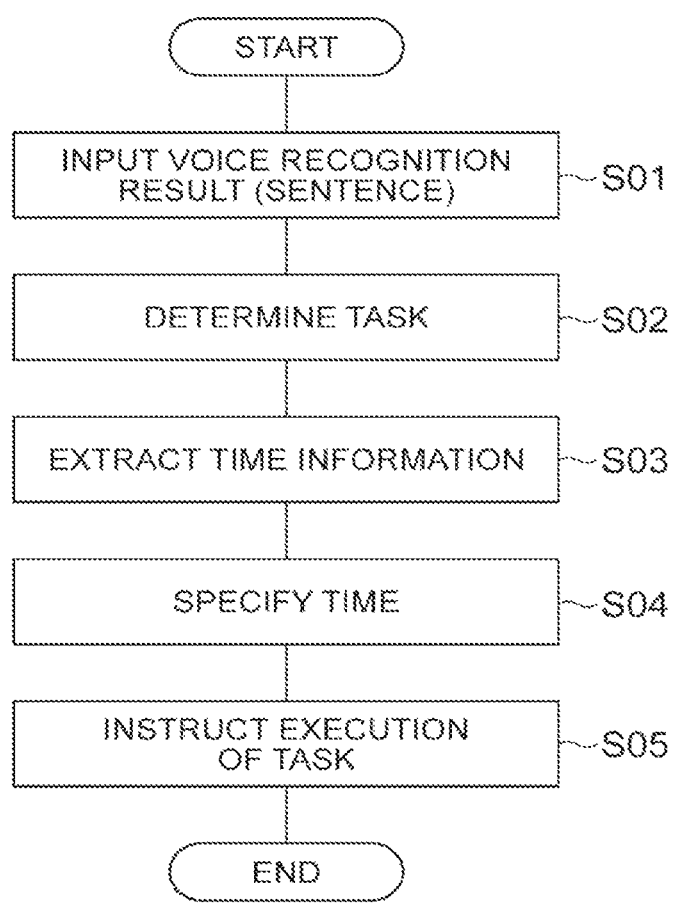
FIG. 3 is a flowchart which shows processing executed by a task determination device that is a function execution instruction system according to the embodiment of the present invention.

Subsequently, processing (an operation method performed by the task determination device 10) executed by the task determination device 10 according to the present embodiment will be described using the flowchart of FIG. 3. This processing is performed every time a sentence, which is the utterance of a user, is transmitted from the communication terminal 20. The sentence is obtained from a voice by the voice recognition of the voice recognition device 30 as described above. In this processing, a sentence, which is a result of the voice recognition, is received and input by the sentence input unit 12 (S01). Subsequently, a task the execution of which is instructed on the basis of the sentence is determined by the execution function determination unit 13 (S02).

Moreover, time information indicating a time is extracted from the sentence by the time information extraction unit 14 (S03). At this time, supplementary information may be extracted at the same time. If the task is determined and the time information is extracted, the time specification unit 15 specifies a time used for the execution of the task on the basis of the time information according to the task (S04). At this time, the time may be specified also on the basis of the supplementary information. Continuously, the function execution instruction unit 11 instructs the communication terminal 20 to perform the execution of the task determined by the execution function determination unit 13, which uses the time specified by the time specification unit 15 (S05). In the communication terminal 20, the task using the specified time is executed according to the instruction. The description above is processing executed by the task determination device 10 according to the present embodiment.

In the present embodiment, a time used for the execution of a function is specified on the basis of time information extracted from an input sentence in accordance with a determined task. Therefore, even if a time expression included in the sentence, that is, a time indicated by the utterance of the user, is omitted, ambiguous, or the like, according to a task the execution of which is instructed, a time used for the execution of the task is appropriately specified. Therefore, according to the present embodiment, even if the time expression included in the sentence when a task is executed on the basis of the sentence is omitted, ambiguous, or the like, it is possible to appropriately execute the task. If an inappropriate task is executed, re-execution of the task or the like is required. In the present embodiment, the execution of an inappropriate task is prevented, and thereby the re-execution of the task or the like can be prevented. Therefore, according to the present embodiment, it is possible to suppress an increase in a load of information processing due to the re-execution of a task or the like in the communication terminal 20 that is a subject for executing the task.

If the time is specified also on the basis of supplementary information in addition to the time information, the time is specified more appropriately. However, it is not surely necessary to use supplementary information to specify the time.

In addition, as in the present embodiment, a future or past time for a current time may be specified in accordance with a task. According to this configuration, the time is appropriately and reliably specified. However, instead of the future or past time being uniformly specified according to a task as shown in FIG. 2, the time may be arbitrarily specified.

In the present embodiment, the task determination device 10 receives and inputs a sentence, which is a result of voice recognition, from the communication terminal 20. However, the task determination device 10 may receive a voice from the communication terminal 20 and acquire a sentence by performing voice recognition. In addition, a sentence input to the task determination device 10 is the result of the voice recognition in the present embodiment, but it may not be the result of the voice recognition (for example, a sentence input by an operation of a user with respect to the communication terminal 20).

In the present embodiment, a task is executed by the communication terminal 20, but the task may be executed by an execution subject other than the communication terminal 20. For example, in a case of the tasks such as a recording reservation, a recording reproduction, and a viewing reservation described above, another terminal such as a television capable of recording and reproduction of moving images may be the execution subject for executing a task. In addition, some functions of the task determination device 10 according to the present embodiment may be included in the subject for executing a task (the communication terminal 20 in the embodiment described above). In this case, the task determination device 10 and the subject for executing a task constitute the function execution instruction system according to an embodiment of the present invention. In addition, all functions of the task determination device 10 according to the present embodiment may be included in the subject for executing a task. In this case, the subject for executing a task constitutes the function execution instruction system according to an embodiment of the present invention. Moreover, the task determination device 10 may include a function of the voice recognition device 30.

Note that the block diagram used in the description of the embodiment described above shows blocks in units of function. These functional blocks (components) are realized by an arbitrary combination of at least one of hardware and software. In addition, a method of realizing each functional block is not particularly limited. That is, each functional block may be realized using one device physically or logically coupled thereto, or may be realized by directly or indirectly (for example, using a wired, wireless, or the like) connecting two or more devices, which has been physically or logically separated from each other, and using a plurality of these devices. The functional block may be realized by combining software with one device or the plurality of devices.

The function includes determination, judging, calculation, computation, processing, derivation, investigation, search, confirmation, reception, transmission, output, access, resolution, selection, choice, establishment, comparison, assumption, expectation, presumption, broadcasting, notifying, communicating, forwarding, configuring, reconfiguring, allocating, mapping, assigning, and the like, but the present invention is not limited thereto. For example, a functional block (component) that causes transmission to be functioned is called a transmitting unit or a transmitter. In any case, as described above, the realization method is not particularly limited.

Figure 4:
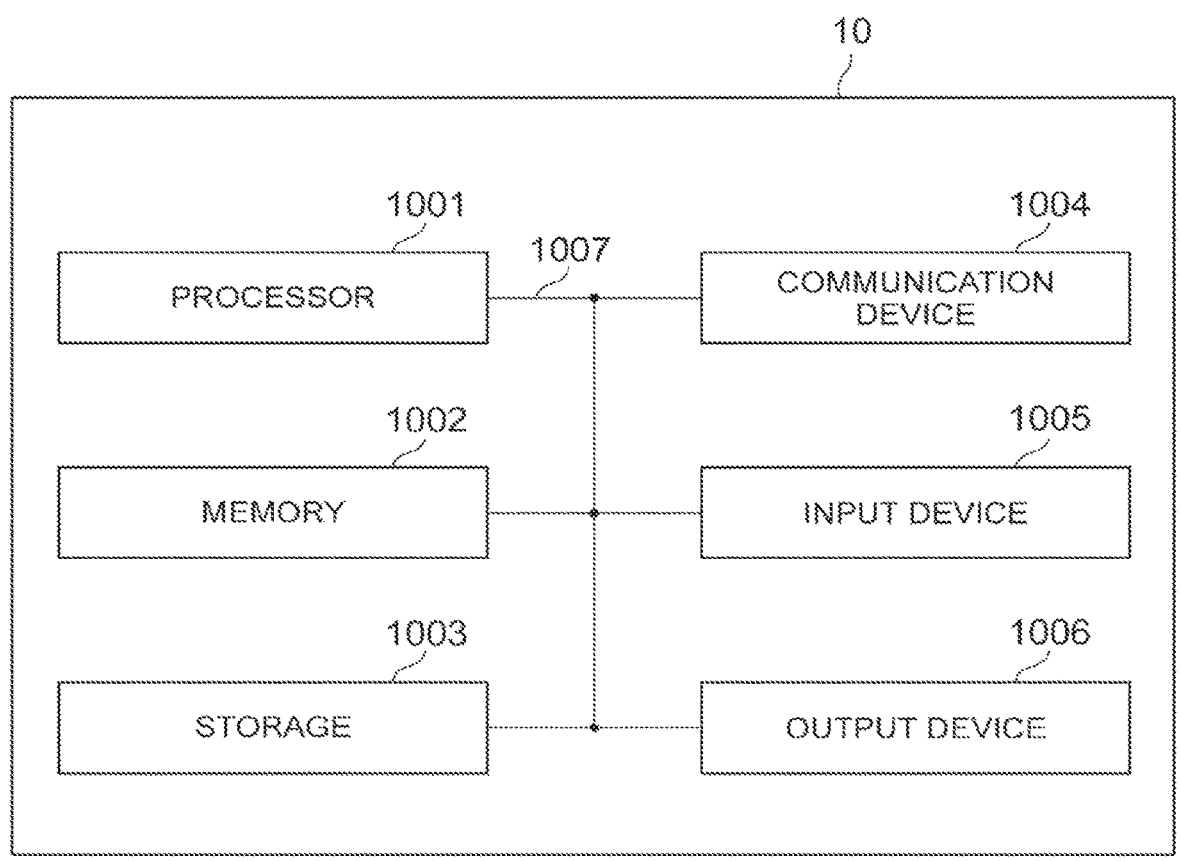
FIG. 4 is a diagram which shows a hardware configuration of the task determination device that is a function execution instruction system according to the embodiment of the present invention.

For example, the task determination device 10 according to an embodiment of the present disclosure may function as a computer that performs processing of the method of the present disclosure. FIG. 4 is a diagram which shows an example of a hardware configuration of the task determination device 10 according to an embodiment of the present disclosure. The task determination device 10 described above may be physically configured as a computer device including a processor 1001, a memory 1002, a storage 1003, a communication device 1004, an input device 1005, an output device 1006, a bus 1007, and the like. Moreover, the communication terminal 20 and the voice recognition device 30 may have the same hardware constituents.

In the following description, a term "device" can be replaced with a circuit, a device, a unit, or the like. The hardware constituents of the task determination device 10 may be configured to include one or more of the devices shown in FIG. 4, or may be configured not to include some devices.

Each function in the task determination device 10 is realized by the processor 1001 performing an arithmetic operation by reading predetermined software (program) on hardware such as the processor 1001 and the memory 1002, and controlling communication by the communication device 1004 or controlling at least one of reading and writing of data in the memory 1002 and the storage 1003.

The processor 1001 controls an entire computer by, for example, causing an operating system to operate. The processor 1001 may be configured by a central processing unit (CPU) including an interface with a peripheral device, a control device, an arithmetic operation device, a register, and the like. For example, each function in the task determination device 10 may be realized by the processor 1001.

The processor 1001 reads out a program (a program code), a software module, data, and the like from at least one of the storage 1003 and the communication device 1004 to the memory 1002, and executes various types of processing according to these. As the program, a program that causes a computer to execute at least a part of the operation described in the embodiment described above is used. For example, each function in the task determination device 10 may be realized by a control program stored in the memory 1002 and operating in the processor 1001. Although it has been described that the various types of processing described above are executed by one processor 1001, the processing may be executed simultaneously or sequentially by two or more processors 1001. The processor 1001 may be implemented by one or more chips. Note that the program may be transmitted from the network via an electric telecommunication line.

The memory 1002 is a computer-readable recording medium, and may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store an executable program (program code), a software module, and the like for implementing the method according to an embodiment of the present disclosure.

The storage 1003 is a computer-readable recording medium, and may be configured by at least one of, for example, an optical disc such as a compact disc ROM (CD-ROM), a hard disk drive, a flexible disk, and a magneto-optical disk (for example, a compact disk, a digital versatile disk, a Blu-ray (registered trademark)), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a data base including at least one of the memory 1002 and the storage 1003, a server, or any other suitable medium.

The communication device 1004 is hardware (transmission or reception device) for performing communication between computers via at least one of a wired network and a wireless network, and is also referred to as, for example, a network device, a network controller, a network card, a communication module, or the like.

The input device 1005 is an input device (for example, a keyboard, a mouse, a microphone, a switch, a button, a sensor, and the like) which receives an input from the outside. The output device 1006 is an output device (for example, a display, a speaker, an LED lamp, and the like) which performs an output to the outside. Note that the input device 1005 and the output device 1006 may be configured to be integrated (for example, a touch panel).

In addition, various devices such as the processor 1001 and the memory 1002 are connected by the bus 1007 for communicating information. The bus 1007 may be configured to use a single bus, and may also be configured to use a different bus for each device.

In addition, the task determination device 10 may be configured to include hardware such as a microprocessor, a digital signal processor (DSP), an application specific integrated circuit (ASIC), a programmable logic device (PLD), and a field programmable gate array (FPGA), and some or all of functional blocks may also be realized by the hardware. For example, the processor 1001 may be implemented using at least one of these pieces of hardware.

Notification of information is not limited to the aspects or embodiments described in the present disclosure, and may be performed using other methods.

The processing procedure, sequence, flowchart, and the like of each aspect or embodiment described in the present disclosure may be changed in order as long as there is no contradiction. For example, the methods described in the present disclosure present various steps of elements by using an exemplary order, and the present invention is not limited to the presented specific order.

The input or output information and the like may be stored in a specific place (for example, a memory) or may be managed using a management table. The input or output information and the like can be overwritten, updated, or added. The output information or the like may be deleted. The input information or the like may be transmitted to another device.

The determination may be performed by a value represented by 1 bit (0 or 1), may be performed by a Boolean value (Boolean: true or false), or may be performed by comparing numerical values (for example, comparison with a predetermined value).

Each aspect or embodiment described in the present disclosure may be used alone, may be used in combination, or may be used by switching along with an execution. Moreover, the notification of predetermined information (for example, the notification of "it is X") is not limited to being explicitly performed, and may be performed implicitly (for example, by not performing the notification of predetermined information).

Although the present disclosure has been described in detail as above, it is obvious to those skilled in the art that the present disclosure is not limited to the embodiments described in the present disclosure. The present disclosure can be implemented as modified and changed aspects without departing from the spirit and scope of the present disclosure defined by the description of the claims. Therefore, the description of the present disclosure is intended for exemplary description, and has no restrictive meaning to the present disclosure.

Regardless of whether it is called software, firmware, middleware, microcode, hardware description language, or another name, software can be widely interpreted to refer to commands, a command set, codes, code segments, program codes, a program, a sub program, a software module, an application, a software application, a software package, a routine, a sub routine, an object, an executable file, an execution thread, an order, a function, or the like.

In addition, software, commands, information, and the like may be transmitted and received via a transmission medium. For example, when software is transmitted from a web site, a server, or another remote source using at least one of wired technology (a coaxial cable, an optical fiber cable, a twisted-pair wire, a digital subscriber line (DSL), or the like) and wireless technology (infrared rays, microwaves, or the like), at least one of the wired technology and the wireless technology is included in the definition of the transmission medium.

Information, signals, and the like described in this disclosure may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Note that the terms described in this specification and/or the terms required for understanding this specification may be substituted by terms having the same or similar meanings.

In addition, information, parameters, and the like described in this specification may be expressed by absolute values, may be expressed by values relative to a predetermined value, or may be expressed by other corresponding information.

Names which are used for the above-mentioned parameters are not restrictive in any viewpoint. Expressions or the like using the parameters may be different from the expressions which are explicitly disclosed in this specification.

The term "determining" or "determination" which is used in this specification may include various types of operations. The term "determining" or "determination" may include, for example, cases in which judging, calculating, computing, processing, deriving, investigating, looking up, search, inquiry (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined." In addition, "determining (determination)" may be read as "assuming," "expecting," "considering", or the like.

The terms "connected" and "coupled," or any variants of these can mean any direct or indirect connection or coupling between two or more elements, and may include a presence of one or more intermediate elements between the two elements "connected" or "coupled" with each other. The coupling or connection between the elements may be physical, logical, or a combination thereof. For example, "connection" may be read as "access." When it is used in the present disclosure, the two elements can be set to be some non-limiting and non-inclusive examples using at least one of one or more wires, cables, and printed electrical connections, and can be considered as "being connected" or "being coupled" with each other using electromagnetic energy having wavelengths of radio frequency regions, microwave regions, and optical (both visible and invisible) regions, and the like.

The expression "on the basis of" as used in this specification does not mean "on the basis of only" unless otherwise described. In other words, the expression "on the basis of" means both "on the basis of only" and "on the basis of at least."

When the terms "include," "including," and modifications thereof are used in this specification, the terms are intended to have a comprehensive meaning similar to the term "comprising." The term "or" which is used in this specification is not intended to mean an exclusive logical sum.

In the present disclosure, when articles are added by translation, for example, a, an, and the in English, the present disclosure may include that nouns following these articles are plural.

In the present disclosure, the term "A and B are different" may mean "A and B are different from each other." Note that the term may mean that "each of A and B is different from C". Terms such as "being separated" and "being coupled" may also be interpreted similarly to "being different."

REFERENCE SIGNS LIST

10 TASK DETERMINATION DEVICE
11 FUNCTION EXECUTION INSTRUCTION UNIT
12 SENTENCE INPUT UNIT
13 EXECUTION FUNCTION DETERMINATION UNIT
14 TIME INFORMATION EXTRACTION UNIT
15 TIME SPECIFICATION UNIT
20 COMMUNICATION TERMINAL
30 VOICE RECOGNITION DEVICE
1001 PROCESSOR
1002 MEMORY
1003 STORAGE
1004 COMMUNICATION DEVICE
1005 INPUT DEVICE
1006 OUTPUT DEVICE
1007 BUS

The invention claimed is:

1. A function execution instruction system comprising circuitry configured to:
   instruct execution of one or more functions;
   input a sentence;
   determine a function the execution of which is instructed on the basis of the sentence;
   extract time information indicating a time from the sentence; and
   in accordance with the function determined, specify a time used for the execution of the function on the basis of the time information,
   wherein the circuitry
      instructs the execution of the function determined, which uses the time specified,
      extracts supplementary information used for time specification other than time information from the sentence, and specifies a time also on the basis of the supplementary information, the supplementary information being a keyword set in advance, the circuitry specifies the time used for the execution of the function based on the association between the keyword and a time zone stored in advance.

2. The function execution instruction system according to claim 1,
wherein the circuitry specifies a future or past time as a time used for the execution of a function in accordance with the function determined.

3. A method implemented by circuitry of a function execution instruction system, the method comprising:
instructing execution of one or more functions;
inputting a sentence;
determining a function the execution of which is instructed on the basis of the sentence;
extracting time information indicating a time from the sentence; and
in accordance with the function determined, specifying a time used for the execution of the function on the basis of the time information,
wherein the method further includes
instructing the execution of the function determined, which uses the time specified,
extracting supplementary information used for time specification other than time information from the sentence, and
specifying a time also on the basis of the supplementary information,
the supplementary information being a keyword set in advance, the method including specifying the time used for the execution of the function based on the association between the keyword and a time zone stored in advance.

* * * * *